A. R. GONZALEZ.
RAIL FASTENER.
APPLICATION FILED AUG. 22, 1911.
1,034,614.
Patented Aug. 6, 1912.
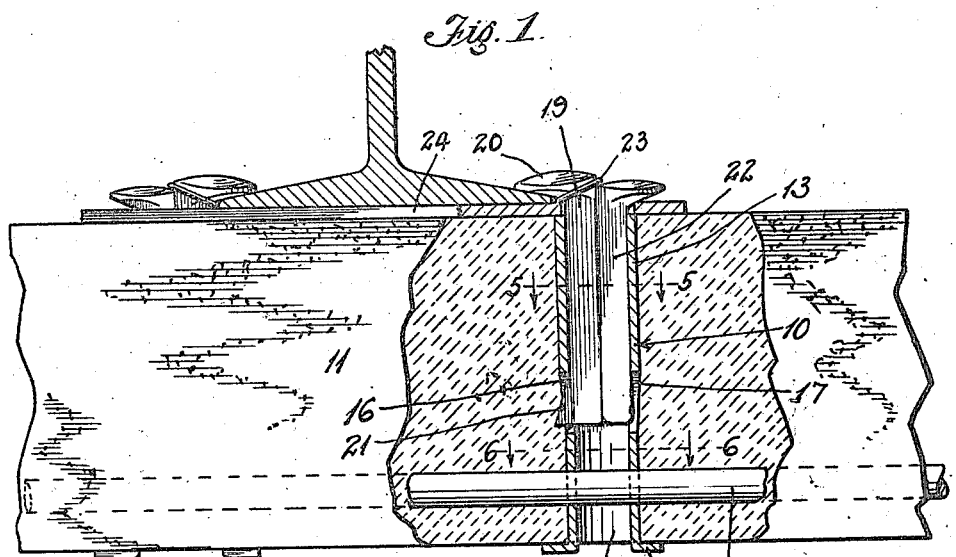
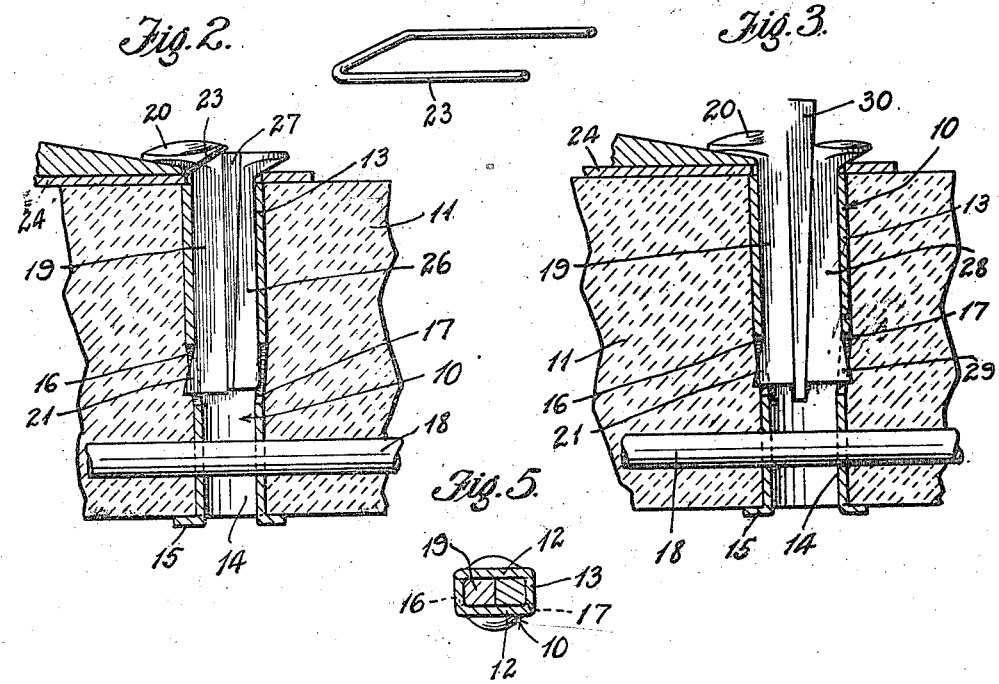
Witnesses
Inventor.
Alvin R. Gonzalez.
Attys.

UNITED STATES PATENT OFFICE.

ALVIN R. GONZALEZ, OF LOS ANGELES, CALIFORNIA.

RAIL-FASTENER.

1,034,614.  Specification of Letters Patent.  Patented Aug. 6, 1912.

Application filed August 22, 1911. Serial No. 645,449.

*To all whom it may concern:*

Be it known that I, ALVIN R. GONZALEZ, a citizen of the United States, residing at Los Angeles, in the county of Los Angeles and State of California, have invented new and useful Improvements in Rail - Fasteners, of which the following is a specification.

This invention relates to improvements in rail fasteners, and particularly to rail fasteners that are adapted to be mounted in artificial or composition ties or similar rail supporting surfaces.

It is an object of the invention to provide a rail fastener, a portion of which may be embedded in a concrete or other artificial tie, the other portion of the fastening being capable of being inserted or driven into place in the tie after the rail has been placed thereon.

It is a further object of the invention to provide a rail fastening means made up of spike receiving sockets adapted to be mounted in the material of the tie and provided with anchoring means for holding the same, in place, the sockets having recesses or apertures in their walls, and removable spikes, some of which are provided with apertures engaging projections while others act as wedges for holding the said projections in engagement with the apertures of the sockets.

In the accompanying drawing forming a part of this specification, Figure 1 is a view partially in section and partially in elevation of a railroad tie having the improved rail fasteners applied thereto. Fig. 2 is a detail sectional view through one of the fasteners and the adjacent portions of the tie showing a slightly different form of wedging spike. Fig. 3 is a similar detail view showing a still different arrangement of the wedging spikes. Fig. 4 is a detail perspective view of a fastening clip adapted to be applied to the head of a spike. Fig. 5 is a transverse sectional view through the socket of the rail fastener, taken upon the line 5—5 of Fig. 1. Fig. 6 is a similar detail sectional view taken upon the line 6—6 of Fig. 1.

The details and features of the invention will now be more particularly described, reference being had to the said drawing in which 10 indicates a sleeve or socket which is adapted to be embedded in a concrete or other composition tie as 11. The said socket 10 is usually formed of tubular material such as piping of a proper diameter and the portion thereof which is to occupy the upper part of the recess in the tie is preferably flattened as indicated in Fig. 5 so that the side walls 12 and edge walls 13 thereof are arranged to extend in parallel planes making an oblong opening in cross section as clearly indicated in said Fig. 5. The lower portion of the socket is however, preferably permitted to remain cylindrical as indicated at 14. The lower end of said cylindrical portion is also usually formed with projections 15 which may be folded to one side or turned over against the bottom of the tie as indicated in the drawing. About centrally of the longitudinal length of the socket recesses preferably in the form of apertures 16 and 17 are provided to coöperate with the rail engaging portions of the fastener to hold the parts together. In order to further strengthen the mechanism and anchor the sockets 10 in place, one or more longitudinal rods as 18 may be passed through the walls of the cylindrical portion 14 of said sockets, the said rod or rods 18 being embedded in the material of the tie as it is formed. It will of course be understood that sockets at opposite ends of the ties which are in alinement with each other may be anchored by means of the same rod 18 which can be passed through both of them.

The rail engaging means comprises a spike 19 having the usual rail flange engaging head 20; while its socket engaging end is formed with an enlarged portion 21, preferably wedge shaped, and adapted to project outwardly through one of the socket apertures as for instance the aperture 16. In order to hold the said projection in engagement with said socket aperture and prevent the spike from being withdrawn, a coöperating spike 22 is employed which is preferably straight in the shank, its end not being enlarged so that it can be slipped into place to one side of the spike 19 and thus prevent the projection 21 from being withdrawn from the aperture 16 as will be readily understood by reference to Fig. 1. The spike 22 may be prevented from coming out of the socket by means of a wire clip 23 or similar fastening devices. When such clip is employed the closed end thereof is inserted beneath the head 20 of the spike 19 and its free ends are permitted to project over the head of the spike 22 and are turned inwardly over the said head as shown in Fig.

1. In this manner the said spike 22 will be prevented from working loose or being withdrawn from the socket. A bearer plate 24 may be inserted beneath the rail as shown in Fig. 1, the head of the locking spikes 22 resting upon the same. Of course the said bearer plate 24 is formed with apertures which coincide with the ends of the socket 10.

The manner of forming the locking means for the spikes may be varied within the spirit of the invention. For instance as shown in Fig. 2 the rail holding spike 19 may be wedged in position by means of a wedge shaped spike 26 which is formed with an inner beveled edge leaving a wedge shaped space between it and the rail securing spike 19. A wedge 27 is also used to fill this space and prevent the withdrawal of the parts. As shown in Fig. 3 the wedging spike may be formed with a hole engaging projection 29 at its lower end, similar to that on the spike 19 and a wedge shaped space may be also left between the spikes adapted to be occupied by a wedge 30, which may be tightly driven to hold the two spikes in locked position. It will be evident that the fastening spikes may be varied in shape and may have different means for securing them in place within the spirit of the invention.

What I claim is:

1. A rail fastener comprising an apertured socket adapted to be embedded in the material of a tie and having flanges adapted to fold against the tie for preventing the withdrawal of the socket, an anchoring bolt passing through said sockets and embedded in the tie, a rail retaining spike having a wedge end portion adapted to project into the apertures of the socket, a wedge shaped securing spike also adapted to extend into the socket, and a wedge fitting between the said spikes for locking them in place.

2. A rail fastener comprising a tubular socket having flattened portions and formed with apertures in its opposite edges, the said flattened portion being adapted to receive the shanks of securing spikes, a rail engaging spike having a projection adapted to engage one of said apertures, a wedging spike having a projection adapted to engage one of said apertures, an intermediate wedge for forcing the spikes apart and into engagement with the apertures of the socket, and a reinforcing apertured plate interposed between the heads of the spikes and the rail to be secured.

ALVIN R. GONZALEZ.

Witnesses:
J. T. BRADY,
E. L. BRADY.